Patented Apr. 18, 1939

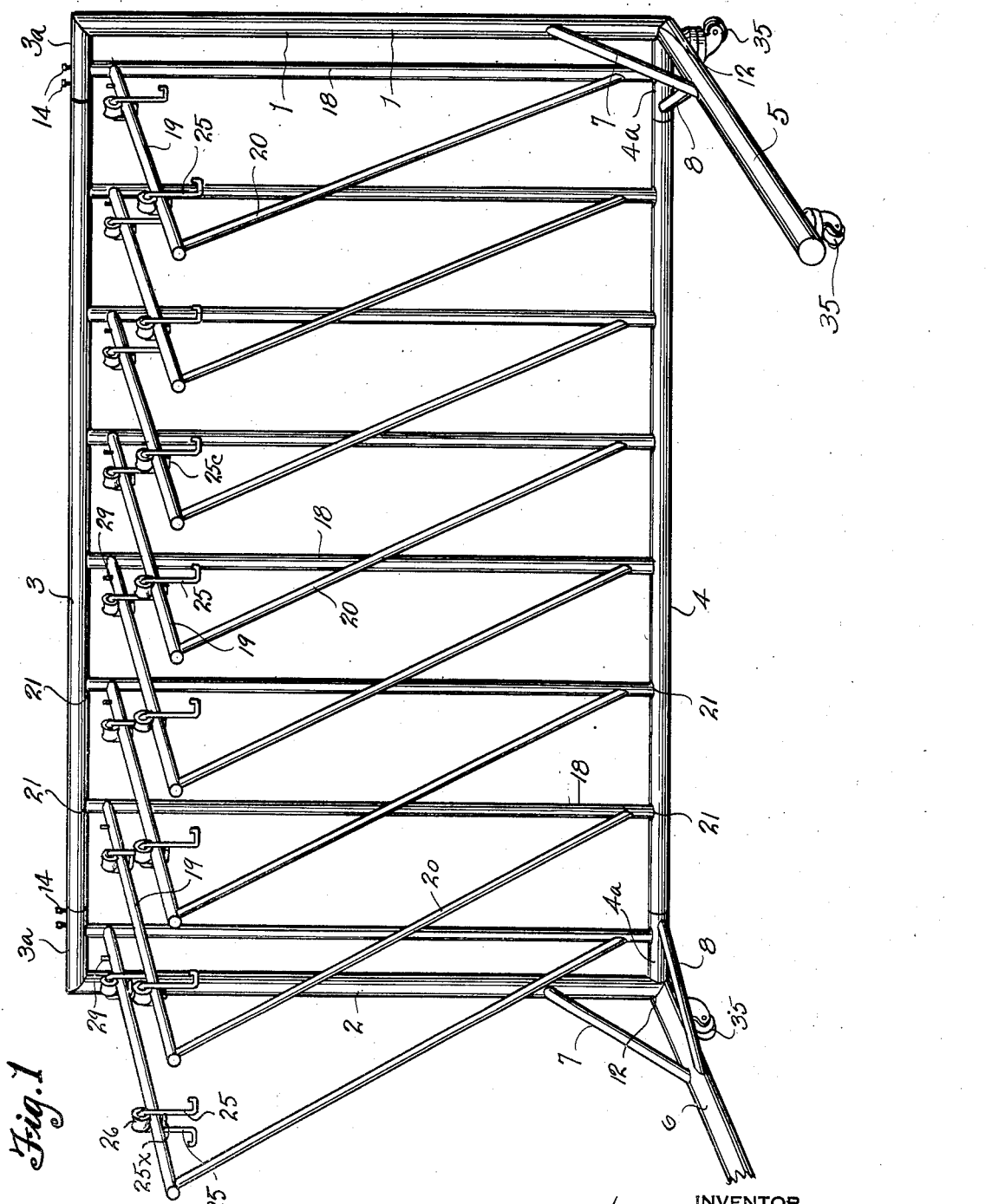

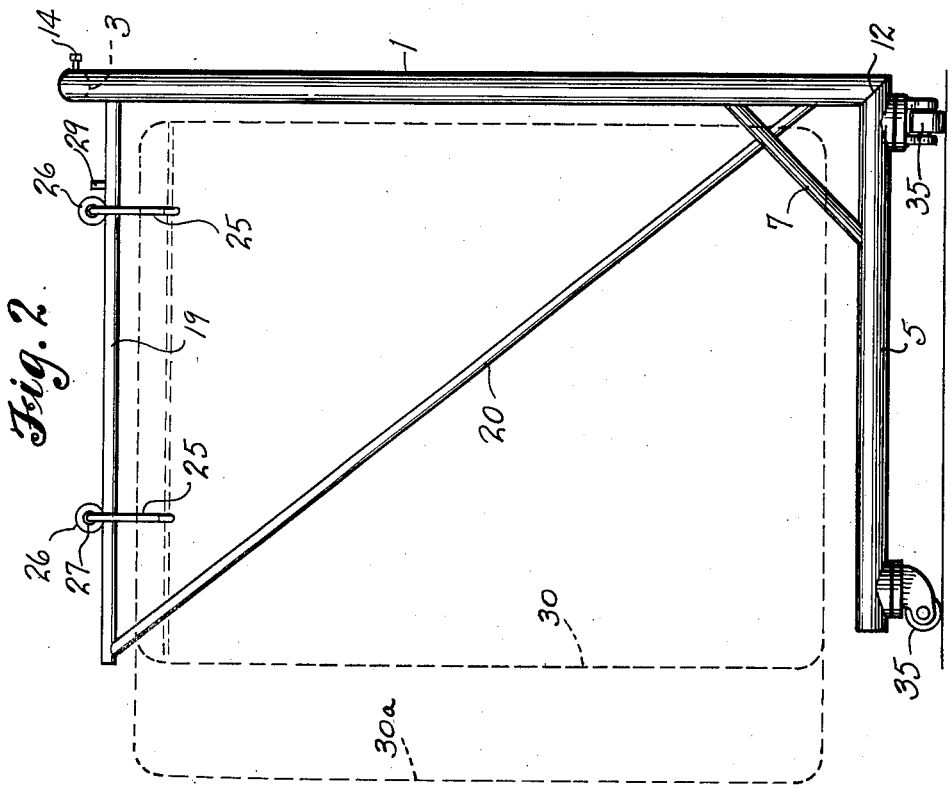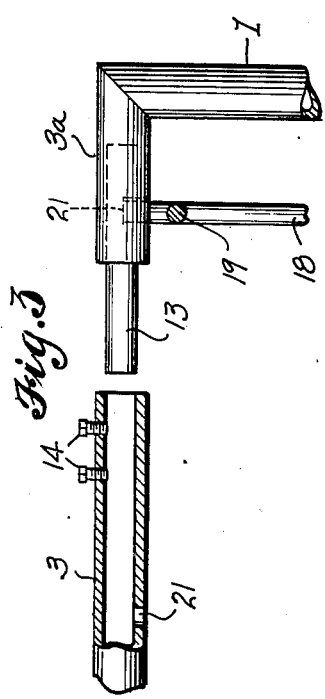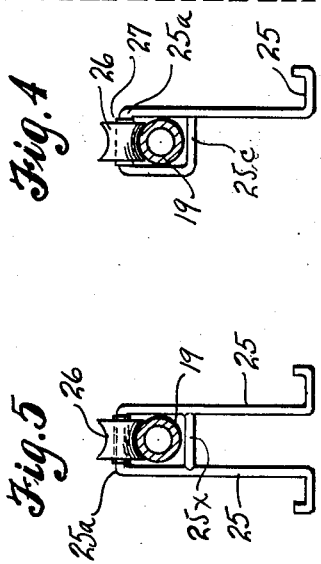

2,154,622

UNITED STATES PATENT OFFICE 2,154,622

PORTABLE DISPLAY RACK

Walter H. Jones, Bothell, Wash.

Application December 17, 1937, Serial No. 180,370

1 Claim. (Cl. 211—28)

This invention relates to improvements in display racks, and it has reference more particularly to racks designated especially for the display of bed springs.

It is the principal object of this invention to provide a display rack of a portable, or movable character, suitable for use in furniture stores, factories and display rooms, and in which rack means is provided whereby a plurality of sets of bed springs may be held suspended in display positions and each swingingly movable within certain limits to afford an easy inspection of both sides thereof.

More specifically stated, the present invention resides in the details of construction of a display rack of the character above stated, embodying a caster, or wheel supported frame structure in which a plurality of spring mounting brackets are mounted, each having a horizontally extending arm equipped for the suspension therefrom of a set of springs, and wherein the brackets are so arranged that the springs on display may be swung to one side or the other thus to give the person inspecting them a good view of their construction from both top and bottom side.

It is also an object of this invention to make provision for travel of each set of springs outwardly along the racket arm from which it is suspended, thus to provide for a better inspection of the springs.

It is a further object of the invention to provide a display rack from detachable, joined parts which makes possible a disassembly of the rack for storage in small space and which facilitates the shipment of such racks.

Other objects of the invention reside in the details of construction of the various parts, in their combination and mode of use, as will hereinafter be fully described.

In accomplishing the above and other objects of the invention, I have provided the improved details of construction, the preferred forms of which are illustrated in the accompanying drawings wherein—

Fig. 1 is a perspective view of a display rack embodied by the present invention.

Fig. 2 is an end view of the same, with a set of springs, indicated in dotted lines, suspended therein.

Fig. 3 is a detail of corner construction.

Fig. 4 is a detail of a hook mounting means.

Fig. 5 is a view of the hooks for the end frame of the rack.

Referring more in detail to the drawings—

In its preferred form of construction, the present device comprises a vertically disposed, rectangular frame structure having opposite end posts 1 and 2 of equal height, joined across their upper and lower ends, respectively, by horizontal beams 3 and 4, thus to form the four sides of the main frame structure; these frame parts being rigidly joined, as will presently be described, thus to form a substantial and durable supporting rack for the display of a plurality of sets of springs therein.

Fixed permanently to the lower ends of the two end posts 1 and 2, and extending horizontally therefrom and in the same lateral direction perpendicularly to the plane of the main frame structure, are base beams 5 and 6, each of which is held rigid with reference to the vertical frame structure by means of two diagonal, brace bars 7 and 8; the brace 7 at each end of the frame being welded, or otherwise solidly and permanently fixed at its ends in the adjacent vertical post and in the base beam, and the brace 8 at each end is likewise solidly and permanently fixed across the corner of the rack with its ends welded to the base beam and to cross beam 4.

In a preferred form of construction, although it is not intended that the device be limited thereto, the vertical end posts 1 and 2 of the main frame, and also the horizontal beams 5 and 6 comprise tubular lengths of pipe of the same diameter. The posts 1 and 2 are cut on a 45° bevel at top and lower ends. Likewise, the beams 5 and 6 have ends that are beveled to fit and are welded to the lower ends of the vertical posts, as designated at 12 in Fig. 2. The cross bars 3 and 4 comprise, in part, short lengths of tubing 3a and 4a at their opposite ends that are welded solidly to upper and lower ends of the end posts, and these have fitted and secured therein short, extended sleeves of tubing 13, over which the ends of the tubular main, or central sections of the cross beams 3 and 4 are applied; these parts being held secure when assembled by means of set screws 14 which are mounted in the ends of the tubes 3 and 4 and are adapted to be tightened against the mounting sleeves 13.

With the parts of the main frame structure so assembled, the cross beams 3 and 4 are parallel and in the same vertical plane. Mounted between these horizontal beams, at regularly spaced intervals, are the spring suspending brackets. Each of these comprises a vertical bar 18, a horizontal arm 19 extending horizontally from the bar 18 near its upper end, and a diagonal brace bar 20 that is fixed at one end to the outer end portion of the arm 19, and at its lower end is fixed to the bar 18 near its lower end, thus forming a substantially triangular frame wherein the upper and lower ends of the bar 18 extend slightly beyond the corners of the triangle to serve as mounting trunnions for the bracket.

The extended upper and lower end portions of each of the vertical bars 18, respectively, are revolubly contained in sockets or holes 21 provided in the supporting cross beams 3 and 4, thus providing a substantial and secure mounting for each bracket, which permits that each bracket may be swung pivotally in its mounting from side to side within certain limits.

As will be observed by reference to the drawings, the brackets all extend in the same lateral direction from the main frame and to the same side thereof toward which the horizontal base supports 5 and 6 extend.

Each bracket is intended for the suspension therefrom of one set of bed springs. The sets may be suspended from the bracket at one end. For this purpose there is provided on each horizontal arm, a pair of suspending hooks 25, each hook being mounted by means of a roller 26 for travel along the arm. The hook, as seen in Fig. 4, has its shank 25a extended through a tubular hub 27 in the roller and is then bent down and then crosswise below the arm, as at 25c, so as to keep the hook from being displaced from the arm. In Fig. 5 is shown the double hook construction for the end bracket, at the left end, as seen in Fig. 1, providing two hooks 25—25 for the suspending of a set of springs at each side of the bracket. A cross bar 25x joins the hooks just below the rod 19 to prevent displacement and add strength. A stop pin 29 at the inner end of each arm limits the inward travel of the rollers and their outward travel is limited by the brace bars 20 against which the inturned parts 25c of the hook shanks will engage. The brackets are spaced approximately 10 inches apart and the hooks thereof hold the bed springs, as designated at 30, in suspended position for easy inspection. The clearance between springs permits the brackets to be swung from side to side for inspection of both sides of the springs and also, by reason of travel of the rollers 26 along the arm, the springs may be withdrawn to some extent, as indicated by the dotted line position 30a in Fig. 2.

It is also intended that the horizontal arms 19 of the brackets shall slope slightly to the rear, toward the supports 18, so that the springs will roll easily back to initial positions when released from extended position 30a.

In order that the rack and its springs may be moved easily about, thus to afford better display, or for other purposes, the horizontal beams 5 and 6 are equipped at inner and outer ends with supporting casters 35.

Racks of this kind may be made in various sizes and lengths to suit various purposes, and as has been explained, afford easy and ready inspection of the articles displayed thereon.

The tubular construction gives an insurance of strength with lightness and the detachment of the cross beams 3 and 4 provides for quick and easy disassembly for storage or convenience in shipping or storage.

Having thus described my invention, what I claim as new therein and desire to secure by Letters Patent is—

A display rack for bed springs, or the like, comprising a main frame structure having opposite end posts, two horizontal bars fixed at their ends in said posts and spaced apart vertically, base beams fixed rigidly to the lower ends of the posts and extending laterally therefrom in the same direction to support the posts in vertical position, a plurality of brackets mounted in said frame between said bars; and all extending to the same side of the frame toward which the base beams are extended; each bracket comprising a vertical rod pivotally mounted at upper and lower ends, respectively, in said vertically spaced horizontal bars, a horizontal arm extended from near the upper end of the vertical rod, and a diagonal brace attached at its ends to the outer end portion of the arm and to the lower end portion of said vertical rod, hook mounting rollers mounted for travel along each of said horizontal arms, hooks depending from said rollers for the suspension of bed springs on display, and means for limiting the travel of the rollers along the arms.

WALTER H. JONES.